United States Patent
Urabe et al.

(10) Patent No.: US 12,099,530 B2
(45) Date of Patent: Sep. 24, 2024

(54) SEARCH USING WORDS FROM USER INTERFACE

(71) Applicant: Nippon Telegraph and Telephone Corporation, Tokyo (JP)

(72) Inventors: Yuki Urabe, Musashino (JP); Shiro Ogasawara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/009,766

(22) PCT Filed: Jun. 16, 2020

(86) PCT No.: PCT/JP2020/023652
§ 371 (c)(1),
(2) Date: Dec. 12, 2022

(87) PCT Pub. No.: WO2021/255843
PCT Pub. Date: Dec. 23, 2021

(65) Prior Publication Data
US 2023/0259536 A1    Aug. 17, 2023

(51) Int. Cl.
*G06F 16/00* (2019.01)
*G06F 16/31* (2019.01)
*G06F 16/335* (2019.01)

(52) U.S. Cl.
CPC .......... *G06F 16/319* (2019.01); *G06F 16/335* (2019.01)

(58) Field of Classification Search
None
See application file for complete search history.

(56) References Cited

U.S. PATENT DOCUMENTS

| | | | | | |
|---|---|---|---|---|---|
| 1,008,803 | A | * | 11/1911 | Ely | G01C 17/00 33/355 R |
| 9,122,748 | B2 | * | 9/2015 | Riedel | G06F 16/31 |
| 9,507,827 | B1 | * | 11/2016 | Poutanen | G06F 16/2228 |
| 9,582,482 | B1 | * | 2/2017 | Sharifi | G06F 3/04845 |
| 10,802,670 | B2 | * | 10/2020 | Brette | G06F 16/24578 |
| 11,151,178 | B2 | * | 10/2021 | Transier | G06F 16/319 |
| 11,704,348 | B2 | * | 7/2023 | Kataoka | G06F 16/90344 707/769 |
| 2013/0339369 | A1 | * | 12/2013 | Li | G06F 16/319 707/742 |

FOREIGN PATENT DOCUMENTS

| | | |
|---|---|---|
| JP | H09231234 | 9/1997 |
| JP | 201928659 | 2/2019 |

OTHER PUBLICATIONS

[No Author Listed] [online], "QuickSolution," Sumitomo Electric Information Systems Co., Ltd., May 8, 2020, retrieved from URL <https://www.sei-info.co.jp/quicksolution>, 99 pages (with English Translation).

(Continued)

*Primary Examiner* — Debbie M Le
(74) *Attorney, Agent, or Firm* — Fish & Richardson P.C.

(57) ABSTRACT

A data processing apparatus includes an acquisition unit that acquires words included in a displayed content of a terminal screen, and a determination unit that determines that the words acquired by the acquisition unit are search candidates in a case where the acquired words are included in an inverted index in which words and identification information of work data including the words are stored in association with each other.

9 Claims, 13 Drawing Sheets

(56) References Cited

OTHER PUBLICATIONS

Urabe et al., "Document Recommendation Method based on the Content of Enterprise Documents for OSS Screen," IEICE Technical Report, 2018, 117(491):25-30, 13 pages (with English Translation).

Urabe et al., "Study of Enterprise Document Reference Support Method Utilizing Text Information from Computer Screen," The Institute of Electronics, Information and Communication Engineers, 2020 General Conference, Mar. 17, 2020, 1 page (with English Translation).

* cited by examiner

SEARCH USING WORDS FROM USER INTERFACE

CROSS-REFERENCE TO RELATED APPLICATIONS

This application is a National Stage application under 35 U.S.C. § 371 of International Application No. PCT/JP2020/023652, having an International Filing Date of Jun. 16, 2020.

The disclosure of the prior application is considered part of the disclosure of this application, and is incorporated by reference in its entirety into this application.

TECHNICAL FIELD

The present disclosure relates to a data processing apparatus, a data processing method, and a data processing program.

BACKGROUND ART

In recent years, there have been a large number of variations in work content due to diversification of customers' demands, equipment, services, and the like. For this reason, even a worker who knows a basic operation method for target work does not know how to perform an operation for irregular work and cannot perform an operation appropriately and smoothly. The work mentioned here is assumed to not only be work centered on a terminal operation such as inputting of the content of a customer's application into a work system, but also be work centered on physical actual work, such as construction work, in which a terminal operation is temporarily performed for referring to and inputting the content of the construction work.

Operational knowledge, and operation logs and the like created during past operations are left as electronic information so that a worker can smoothly perform work in such a case, and it is thus possible to achieve knowledge sharing between persons in charge of work. A worker searches for information for eliminating unknown points of work from a large number of pieces of in-company information, thereby eliminating the unknown points when performing work having a large number of variations centered on terminal utilization work.

However, information such as operational knowledge and operation logs created during past operations are stored in various places such as a shared server or an internal site of a company. As these pieces of information, not only information on target work but also a large amount of information on various topics are created and accumulated in various places. For this reason, it is difficult for a worker to find information related to work being processed.

Consequently, in companies and the like, a search engine (see, for example, NPL 1) may be introduced so that workers may easily find information. A search engine is a system for searching for information that matches a keyword which is input, or information that includes words with high relevance.

However, when a worker does not know a word for obtaining information even when a search engine has been introduced, the worker has to input a different keyword and repeatedly perform searching until information for eliminating unknown points of work is found. That is, even when a search engine has been introduced, the worker cannot find information unless the worker knows what word is to be used for searching to obtain necessary information. In this case, there is a problem in that smooth operation of work is hindered because the worker repeatedly searches for information.

To solve this problem, there has been proposed a method of extracting information related to the content displayed on a terminal screen when there are unknown points from the existing in-company information by selecting a word from the content displayed on the terminal screen, and searching for the word using a search engine (see, for example, NPL 2).

CITATION LIST

Patent Literature

PTL 1: JP 2019-28659 A

Non Patent Literature

NPL 1: Sumitomo Electric Information Systems Co., Ltd., Quick Solution, [online], [retrieved on May 8, 2020], Internet <URL: https://www.sei-info.co.jp/quicksolution/>

NPL 2: Yuki Urabe, Shiro Ogasawara, Haruo Oishi, Hiroyuki Nakamura, "Examination of work document reference support method using terminal screen display information", IEICE, General Conference in 2020, D-9-10 (2020 March).

SUMMARY OF THE INVENTION

Technical Problem

However, even when the method disclosed in NPL 2 is used, there is a problem that information cannot be extracted when words that are not registered in a search engine are searched for. For example, it may be assumed that words "A, B, C" are extracted from the content displayed on a terminal screen by using the method disclosed in NPL 2. However, because the words "A, B, C" are words that do not appear in information registered in the search engine, the number of pieces of information that can be extracted is zero.

In this manner, when the method disclosed in NPL 2 is used, there is a problem that it is not possible to ascertain which words in the content displayed on the terminal screen include related information.

The present disclosure has been made in view of the above circumstances, and an object thereof is to provide a data processing apparatus, a data processing method, and a data processing program that are capable of appropriately acquiring information on words included in the content displayed on a terminal screen.

Means for Solving the Problem

In order to solve the problems described above and accomplish an object, a data processing apparatus according to the present disclosure includes an acquisition unit configured to acquire words included in a displayed content of a terminal screen, and a determination unit configured to determine that the words acquired by the acquisition unit are search candidates in a case where the acquired words are included in an inverted index database in which words and identification information of work data including the words are stored in association with each other.

In addition, a data processing method according to the present disclosure is a data processing method executed by a data processing apparatus, the data processing method including acquiring words included in a displayed content of a terminal screen, and determining the words acquired in the acquiring to be search candidates in a case where the acquired words are included in an inverted index database in which words and identification information of work data including the words are stored in association with each other.

Effects of the Invention

According to the present disclosure, it is possible to appropriately acquire information on words included in the content displayed on a terminal screen.

DESCRIPTION OF EMBODIMENTS

Figure 1:
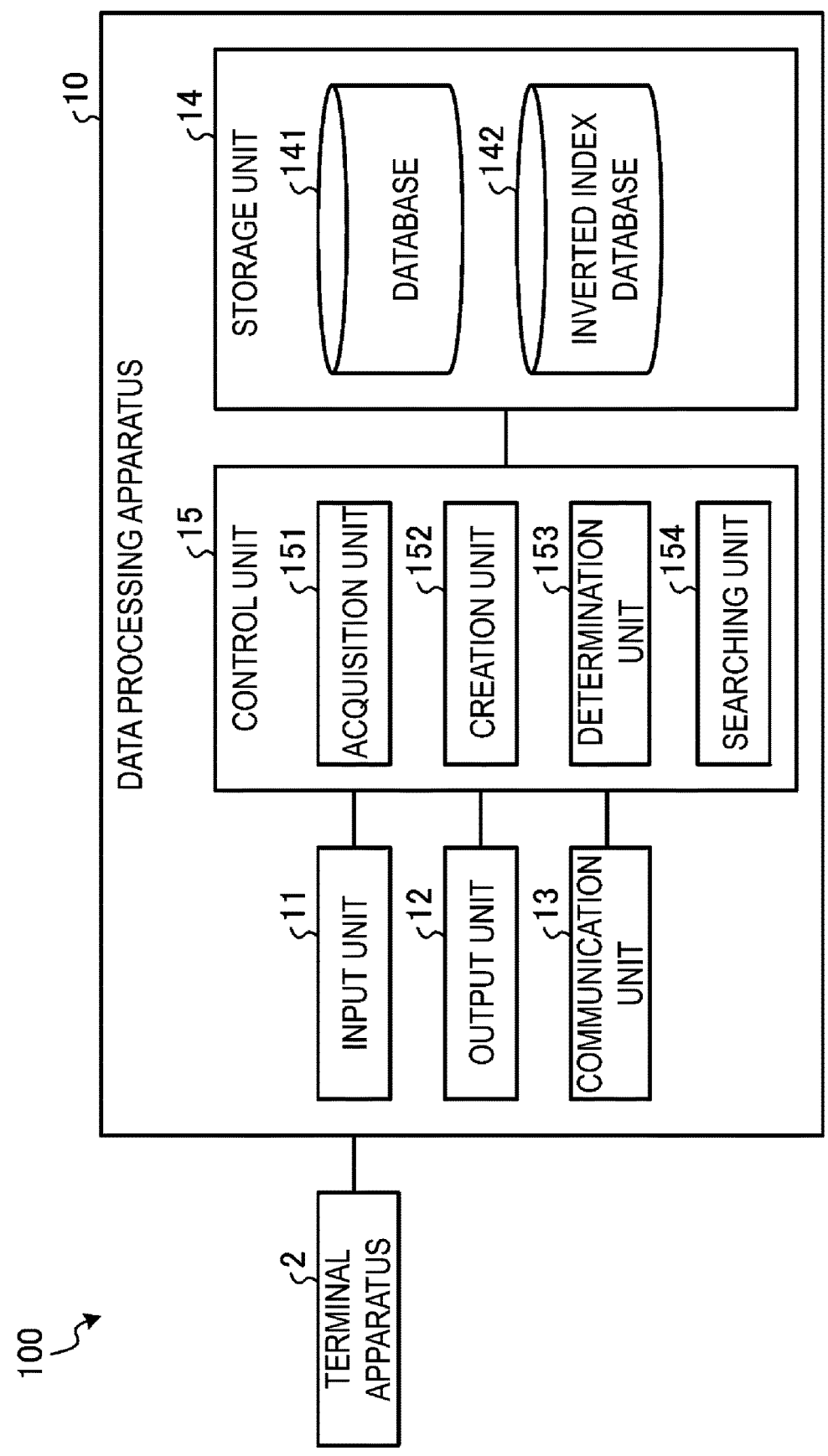
FIG. 1 is a diagram schematically illustrating an example of a configuration of a data processing system according to a first embodiment.

Hereinafter, embodiments of the present disclosure will be described in detail with reference to the drawings. Note that the present disclosure is not limited to the embodiments. Further, in the description of the drawings, the same components are denoted by the same reference numerals and signs.

First Embodiment

A first embodiment of the present disclosure will be described. In the first embodiment of the present disclosure, a situation is assumed where a worker performs work by performing an operation on a work document (work data) displayed on a screen of a terminal apparatus. In the first embodiment, a worker's searching using a word with no related information is reduced by automatically executing searching using only words for which related work data is stored in a database among words included in work data displayed on a terminal screen (hereinafter, referred to as a terminal screen displayed content).

A configuration of a data processing system according to the first embodiment will be described. FIG. 1 is a diagram schematically illustrating an example of the configuration of the data processing system according to the first embodiment.

As illustrated in FIG. 1, a data processing system 100 includes a data processing apparatus 10 and a terminal apparatus 2 with which a worker performs work. The data processing apparatus 10 is connected to the terminal apparatus 2 (terminal), and provides information for eliminating unknown points during the worker's work to the terminal apparatus 2. Note that the data processing apparatus 10 does not need to be another apparatus physically separate from the terminal apparatus 2 and may be a portion of the terminal apparatus 2. In addition, functional units in the data processing apparatus 10 may or may not be physically provided in the same apparatus, and particularly, some of them may be disposed as a portion of the terminal apparatus 2.

Data Processing Apparatus

Next, a configuration of the data processing apparatus 10 will be described. The data processing apparatus 10 includes an input unit 11, an output unit 12, a communication unit 13, a storage unit 14, and a control unit 15.

The input unit 11 is an input interface that receives various operations from an operator of the data processing apparatus 10. For example, the input unit 11 includes an input device such as a touch panel, a sound input device, a keyboard, or a mouse.

The output unit 12 is implemented by a display apparatus such as a liquid crystal display, a printing apparatus such as a printer, an information communication apparatus, or the like.

The communication unit 13 is a communication interface that transmits and receives various pieces of information to and from another apparatus operating on a common fundamental apparatus, or another apparatus connected thereto through a network or the like. The communication unit 13 is implemented by an API, a network interface card (NIC) or the like, and performs communication between another apparatus through a common fundamental apparatus or another apparatus (for example, the terminal apparatus 2) through an electrical communication line such as a local area network (LAN) or the Internet and the control unit 15 (which will be described below). For example, the communication unit 13 acquires the content displayed on a terminal screen of the terminal apparatus 2 through a network and outputs the displayed content to the control unit 15. The communication unit 13 transmits the work data retrieved by the control unit 15 to the terminal apparatus 2.

The storage unit 14 is a storage apparatus such as a hard disk drive (HDD), a solid state drive (SSD), or an optical disc. Note that the storage unit 14 may be a data rewritable semiconductor memory such as a random access memory (RAM), a flash memory, or a nonvolatile static random access memory (NVSRAM). The storage unit 14 stores an operating system (OS) and various programs that are executed in the data processing apparatus 10. The storage unit 14 includes a database 141 and an inverted index database 142.

Figure 2:
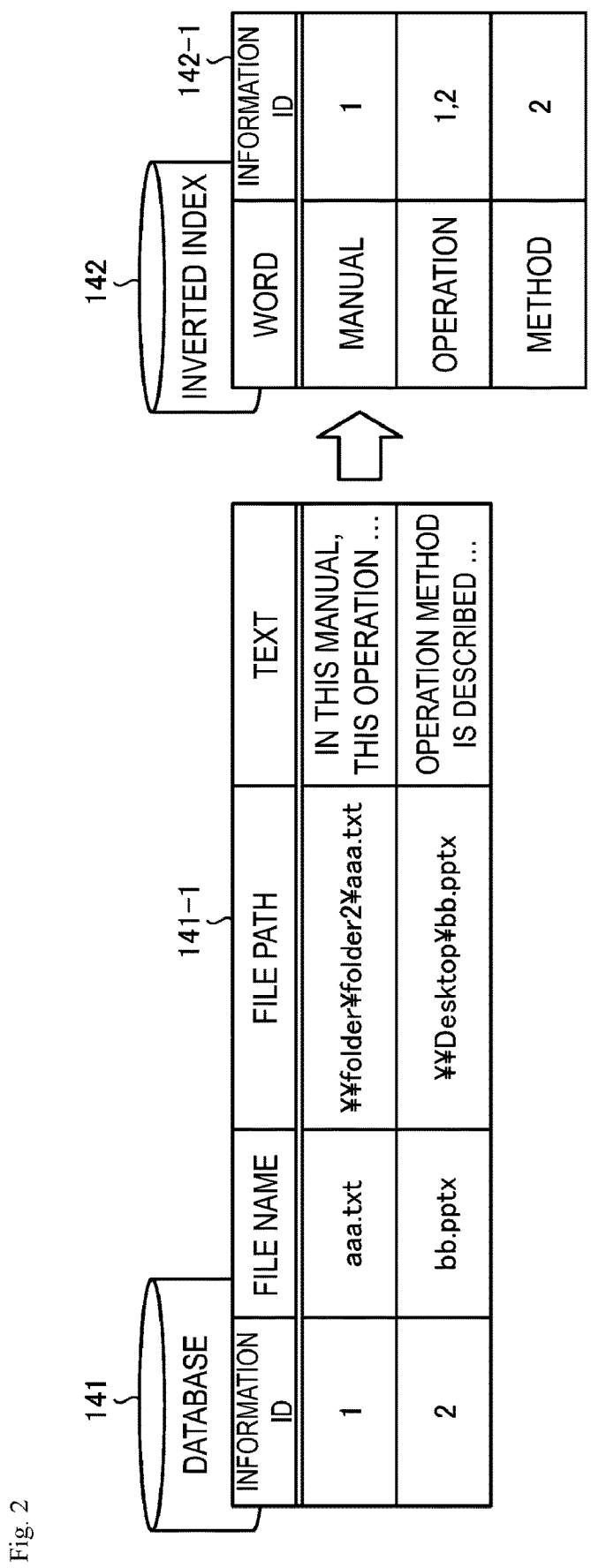
FIG. 2 is a diagram illustrating an example of a data configuration of data stored in a database and an inverted index database.

The database 141 stores access information for work data and text information included in the work data. The database 141 stores unique identification information given to work data, such as operational information and operation logs created during past work, access information for work data (a file name, a URL, a file path, and the like), and text information in the work data. FIG. 2 is a diagram illustrating an example of a data configuration of data stored in the database 141 and the inverted index database 142.

As illustrated in table data 141-1 in FIG. 2, the database 141 stores an information ID which is identification information of work data, a file name, a file path, and text in association with each other as information related to the work data. For example, work data having an identification ID "1" includes a file name "aaa.txt", which can be referred to with the file path "\\folder\folder2\aaa.txt", and includes text information "In THIS MANUAL, THIS OPERATION . . . ".

The inverted index database 142 stores an inverted index. The inverted index includes words and identification information of work data including the words in association with each other. For example, the inverted index 142-1 illustrated in FIG. 2 indicates that, for example, a word "manual" is included in work data of the identification ID "1".

The control unit 15 controls the entire data processing apparatus 10. The control unit 15 is, for example, an electronic circuit such as a central processing unit (CPU) or a micro processing unit (MPU), or an integrated circuit such as an application specific integrated circuit (ASIC) or a field programmable gate array (FPGA). Further, the control unit 15 includes an internal memory for storing programs that define various procedures and control data, and executes each processing operation using the internal memory. In addition, the control unit 15 functions as various processing units by operations of various programs. The control unit 15 includes an acquisition unit 151, a creation unit 152, a determination unit 153, and a searching unit 154.

The acquisition unit 151 acquires words included in a terminal screen displayed content which is being displayed on the terminal apparatus 2. The acquisition unit 151 acquires the terminal screen displayed content which is being displayed on the terminal apparatus 2, and extracts text information of the terminal screen displayed content. The terminal screen displayed content is acquired by UI Automation (hereinafter, referred to as "UTA"), Microsoft active accessibility (hereinafter, referred to as "MASS"), or an interface which is uniquely provided by a program, and the acquisition unit 151 extracts text information from the terminal screen displayed content by identifying and referring to attributes of holding a display value of a label and a display value of a text box. The acquisition unit 151 divides the extracted text information into words. The acquisition unit 151 divides the text information into words, for example, by performing morphological analysis using a morphological analysis tool. Processing performed by the acquisition unit 151 may be executed every time the terminal screen is changed, and may also be executed at a timing when a user gives a command, or the like.

The creation unit 152 creates an inverted index based on information of the database 141 in a case where there is no inverted index in the inverted index database 142, and information is stored in the database 141. Specifically, the creation unit 152 extracts information stored in the database 141 and divides the information into words. Subsequently, the creation unit 152 registers an inverted index having each word as a key and each information specific ID (information ID) as a value in the inverted index database 142.

The determination unit 153 determines whether a word acquired by the acquisition unit 151 is included in the inverted index of the inverted index database 142. In a case where the word acquired by the acquisition unit 151 is included in the inverted index, the determination unit 153 determines that the acquired word is a search candidate.

The searching unit 154 searches for work data from the database 141 using the search candidate word determined by the determination unit 153, and presents search results on the terminal apparatus 2. Note that the searching unit 154 may narrow down information to be searched for by using an AND search, or may extract information including any word in the terminal screen by performing an OR search.

Figure 3:
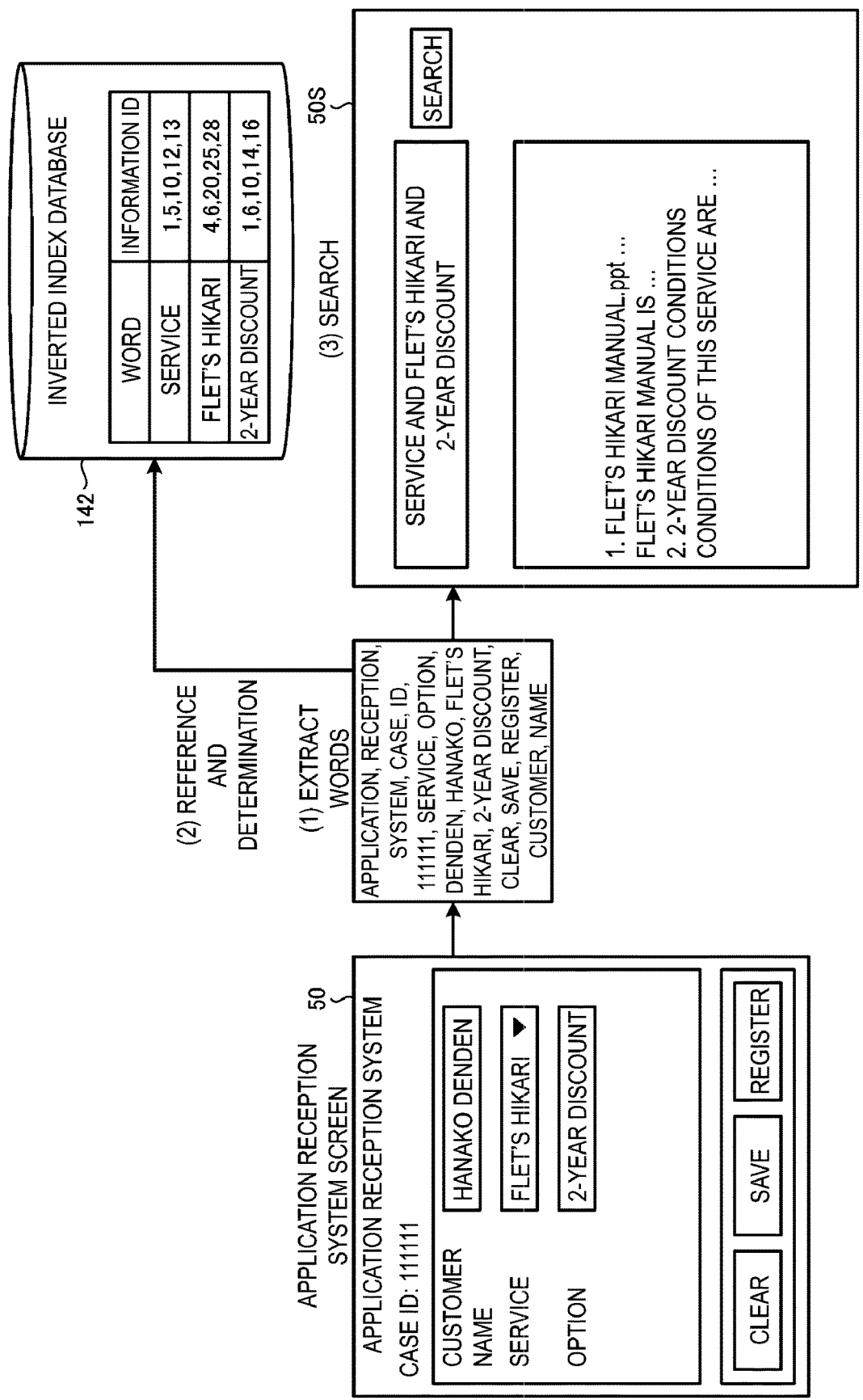
FIG. 3 is a diagram for describing an example of execution of data processing in a data processing apparatus illustrated in FIG. 1.

FIG. 3 is a diagram illustrating an example of execution of data processing in the data processing apparatus 10 illustrated in FIG. 1. As illustrated in FIG. 3, for example, in a case where the terminal apparatus 2 displays an application reception system screen 50, the acquisition unit 151 extracts "APPLICATION", "RECEPTION", "SYSTEM", "CASE", "ID", "111111", "SERVICE", "OPTION", "DENDEN", "HANAKO", "SERVICE", "FLET'S HIKARI", "2-YEAR DISCOUNT", "CLEAR", "SAVE", "REGISTER", "CUSTOMER", and "NAME" which are all the words on the application reception system screen 50 (see (1) in FIG. 3). Subsequently, the determination unit 153 determines whether the words acquired by the acquisition unit 151 is included in the inverted index database with reference to the inverted index database 142 (see (2) in FIG. 3). The determination unit 153 determines that "SERVICE", "FLET'S HIKARI", and "2-YEAR DISCOUNT" included in the inverted index are search candidates. In addition, the searching unit 154 searches for work data by using "SERVICE", "FLET'S HIKARI", and "2-YEAR DISCOUNT" and presents a work data list 505 including all of the "SERVICE", "FLET'S HIKARI", and "2-YEAR DISCOUNT" on the terminal apparatus 2 (see (3) in FIG. 3). (3) in FIG. 3 is an example of an AND search, but may be an OR search.

Procedure of Data Processing Method

Figure 4:
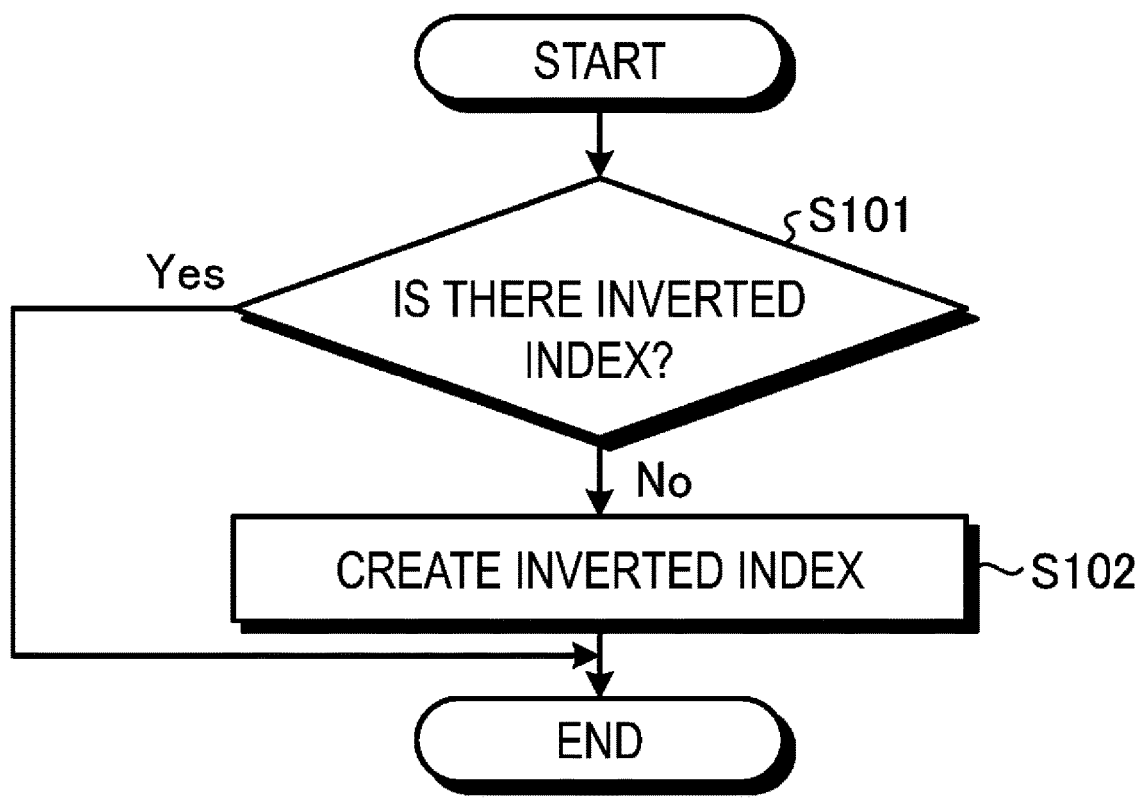
FIG. 4 is a flowchart illustrating a procedure of processing performed by a data processing apparatus 10.

Next, a procedure of a data processing method performed by the data processing apparatus 10 will be described with reference to FIG. 4. FIG. 4 is a flowchart illustrating a procedure of processing performed by the data processing apparatus 10. As illustrated in FIG. 4, the creation unit 152 determines whether the inverted index database 142 includes an inverted index (step S101). In a case where there is no inverted index (step S101: No), the creation unit 152 creates an inverted index based on information of the database 141 (step S102). The processing illustrated in FIG. 4 is executed in advance before the searching processing. In addition, the processing illustrated in FIG. 4 may be executed at regular intervals or may be executed before the searching in a case where an instruction for the searching is given.

Figure 5:
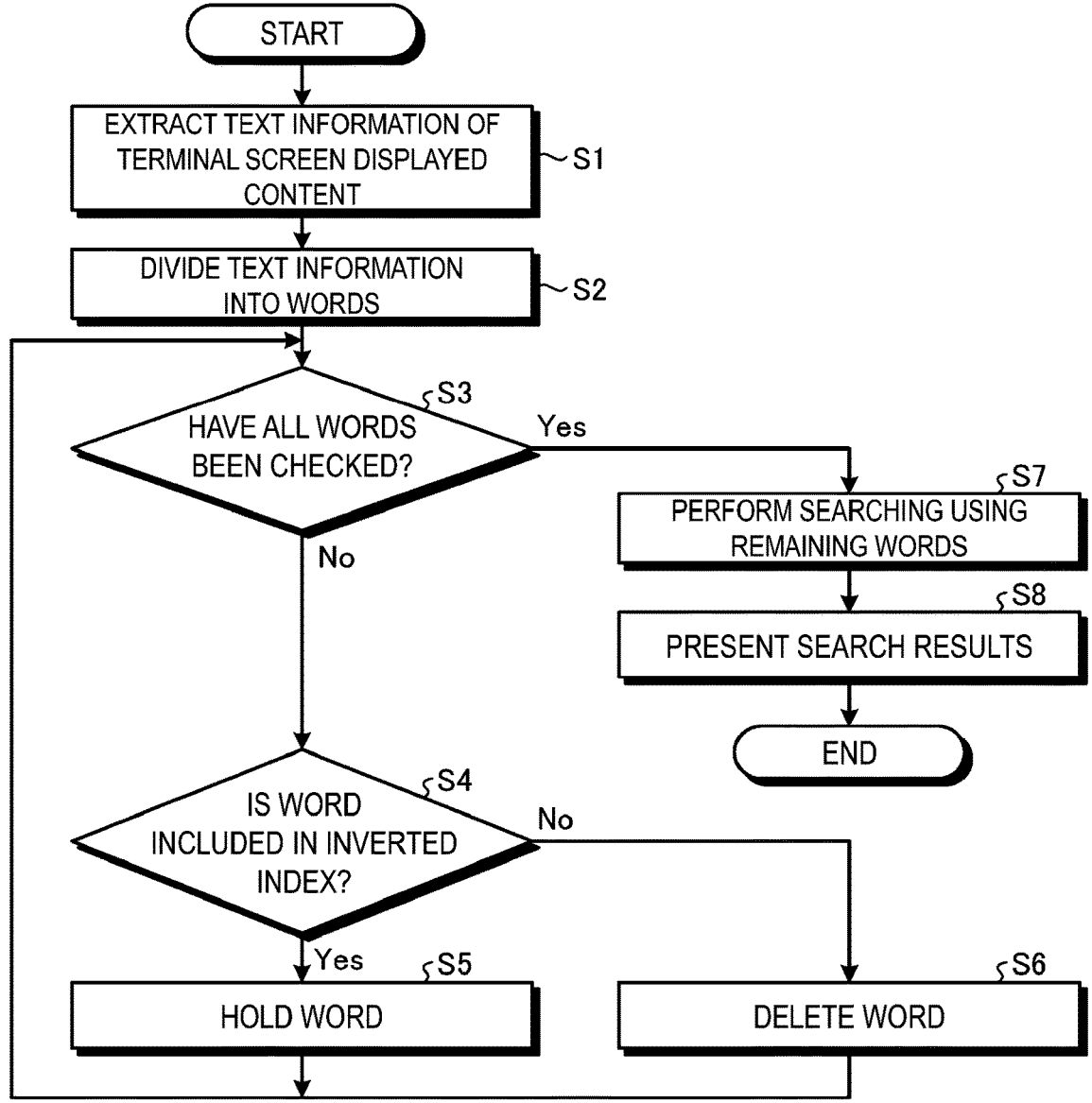
FIG. 5 is a flowchart illustrating a procedure of a data processing method according to a first embodiment.

Next, a procedure of a data processing method performed by the data processing apparatus 10 will be described with reference to FIG. 5. FIG. 5 is a flowchart illustrating a procedure of the data processing method according to the first embodiment.

As illustrated in FIG. 5, the acquisition unit 151 acquires a terminal screen displayed content of the terminal apparatus 2 at a predetermined timing, and extracts text information of the terminal screen displayed content (step S1). Then, the acquisition unit 151 divides the extracted text information into words by using a morphological analysis tool (step S2).

The determination unit 153 determines whether all of the words obtained by the division in step S2 have been checked regarding the presence or absence in the inverted index (step S3).

In a case where not all of the words obtained by the division have been checked regarding the presence or absence in the inverted index (step S3: No), the determination unit 153 determines whether a word to be determined is included in the inverted index (step S4). Further, in a case where the word to be determined is included in the inverted index (step S4: Yes), it is determined that the word to be determined is a search candidate and the word is held (step S5). On the other hand, in a case where when the word to be determined is not included in the inverted index (step S4: No), the word is deleted from the search candidates (step S6). After the processing of step S5 or step S6 is terminated, the determination unit 153 performs the determination processing in step S3.

Further, in a case where all of the words obtained by the division have been checked regarding the presence or absence in the inverted index (step S3: Yes), the searching unit 154 searches the database 141 using words remaining as search candidates (step S7), and presents search results on the terminal apparatus 2 (step S8).

Effects of First Embodiment

As described above, the data processing apparatus 10 according to the first embodiment acquires words included in the terminal screen displayed content of the terminal apparatus 2 being operated by the worker, and determines that the acquired words are search candidates in a case where the acquired words are included in the inverted index. Then, the data processing apparatus 10 searches for work data from the database 141 using the search candidate words, and presents search results on the terminal apparatus 2.

Thus, the data processing apparatus 10 performs searching using only words included in the inverted index among the words included in the terminal screen displayed content. In other words, the data processing apparatus 10 performs searching using only words related to work data that are surely stored in the database 141. For this reason, according to the data processing apparatus 10, it is possible to extract related work data without fail. Thus, according to the data processing apparatus 10, it is possible to appropriately acquire information on words included in the terminal screen displayed content and present the information to the worker who operates the terminal apparatus 2.

Further, the data processing apparatus 10 automatically displays search results of words included in the terminal screen displayed content of the terminal apparatus 2 to the terminal screen of the terminal apparatus 2 without designation of search words by the worker of the terminal apparatus 2. For this reason, according to the data processing apparatus 10, it is possible to reduce the worker's processing burden and improve work efficiency of the worker, thereby achieving smooth work assistance.

Second Embodiment

Next, a second embodiment will be described. In the second embodiment, the number of pieces of work data including each word included in a screen displayed content is presented on the terminal, so that a worker can ascertain the number of pieces of work data for each word. Further, in the second embodiment, it is also possible to present access information (link) for each piece of work data on the terminal, together with the number of pieces of work data including each search candidate word. In this case, the worker can access and refer to work data without inputting a search keyword.

Figure 6:
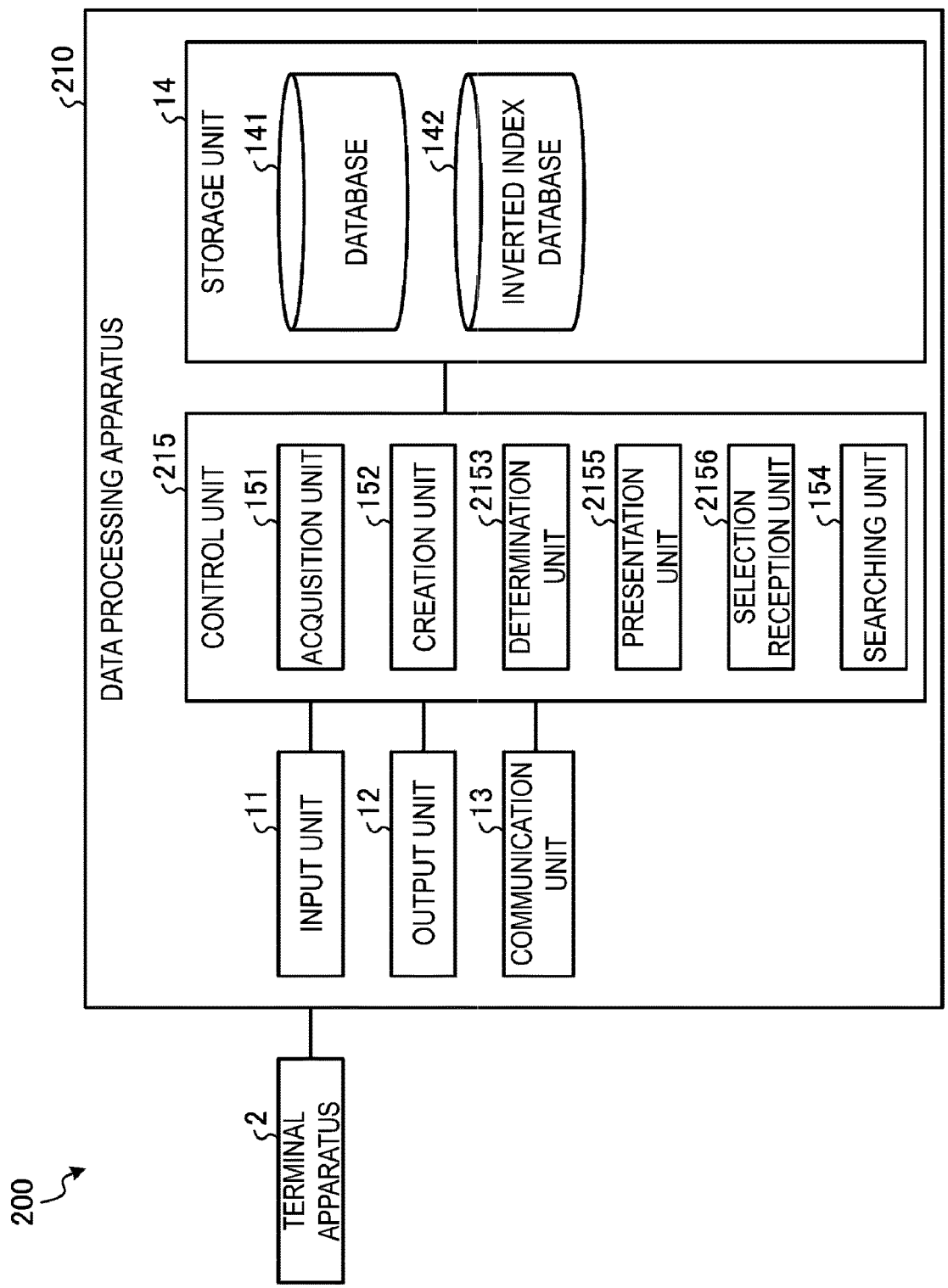
FIG. 6 is a diagram schematically illustrating an example of a configuration of a data processing system according to a second embodiment.

A configuration of a data processing system according to the second embodiment will be described. FIG. 6 is a diagram schematically illustrating an example of the configuration of the data processing system according to the second embodiment. As illustrated in FIG. 6, the data processing system 200 includes a data processing apparatus 210 instead of the data processing apparatus 10 illustrated in FIG. 1.

Data Processing Apparatus

Next, the data processing apparatus 210 will be described. The data processing apparatus 210 includes a control unit 215 as compared to the data processing apparatus 10 in FIG. 1. The control unit 215 includes a determination unit 2153 instead of the determination unit 153 and further includes a presentation unit 2155 and a selection reception unit 2156 (reception unit), as compared to the control unit 15 in FIG. 1.

In a case where words acquired by the acquisition unit 151 are included in an inverted index of the inverted index database 142, the determination unit 2153 determines that the acquired words are search candidates. In addition, the determination unit 2153 determines the number of pieces of work data in which each search candidate word is included, with reference to the inverted index.

The presentation unit 2155 presents search candidate words, and the number of pieces of work data in which each search candidate word is included and/or access information for the work data, which are determined by the determination unit 2153, on the terminal apparatus 2 through the communication unit 13 and a network.

Thereby, a list of the search candidate words included in the terminal screen displayed content of the terminal apparatus 2 and the number of pieces of work data in which each word is included is automatically displayed in the display screen of the terminal apparatus 2. In addition, the worker selects a desired word as a word to be searched for, from among the search candidate words of the displayed list. In this case, the terminal apparatus 2 transmits selection information indicating the word to be searched for, which is selected by the worker, to the data processing apparatus 10.

In addition, the selection reception unit 2156 receives the selection of the word to be searched for from among the search candidate words by receiving the selection information from the terminal apparatus 2.

Subsequently, the determination unit 2153 determines work data in which the word to be searched for is included among work data in which search candidate words are included, with reference to the inverted index. The presentation unit 2155 presents, on the terminal apparatus 2, the search candidate words, and the number of pieces of work data in which each search candidate word and each word to be searched for are included and/or access information for the work data.

The searching unit 154 searches for work data from the database 141 using the word to be searched for in accordance with search instruction information transmitted from the terminal apparatus 2, and presents search results on the terminal apparatus 2.

Example of Data Processing

Figure 7:
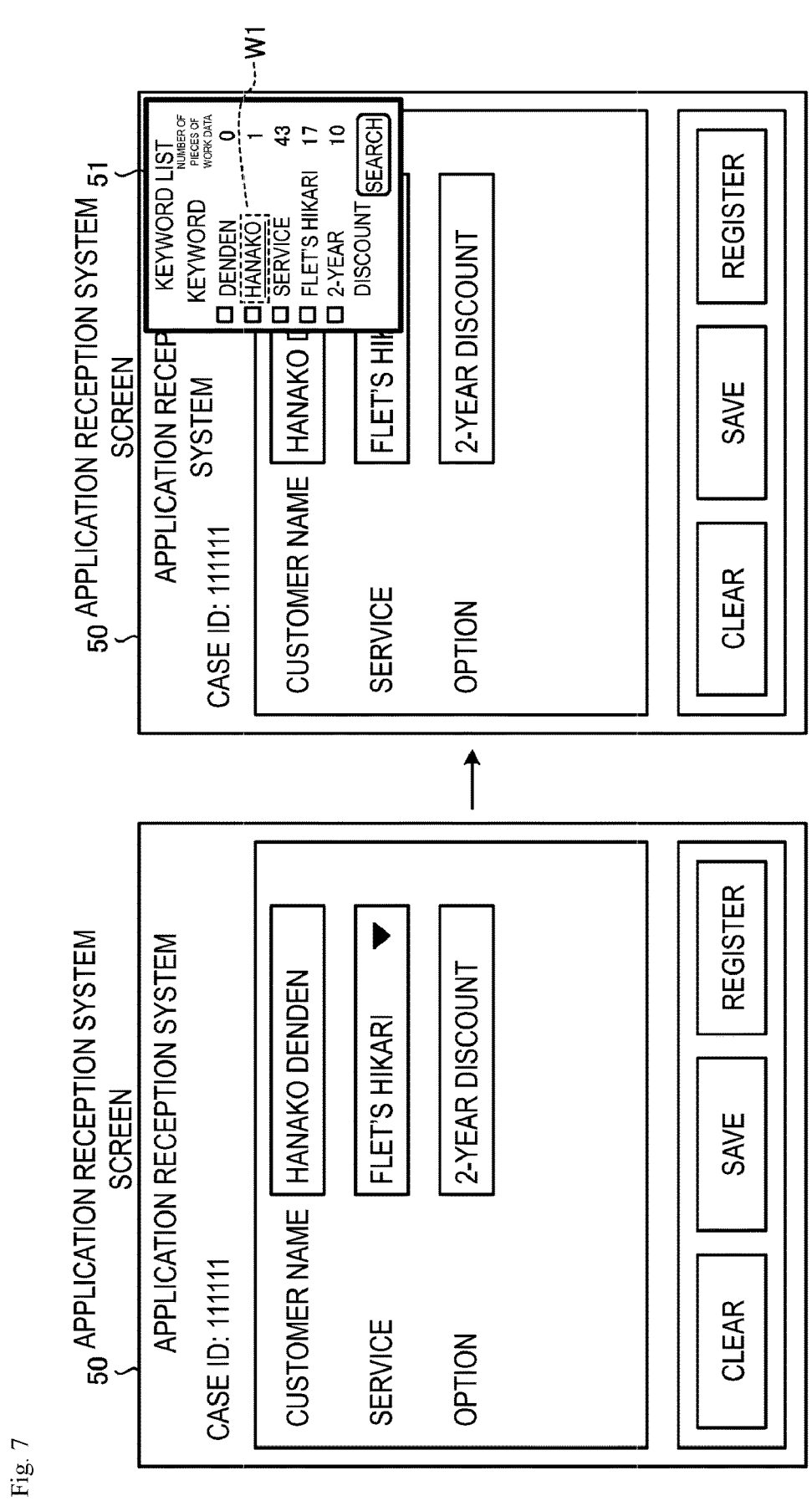
FIG. 7 is a diagram illustrating a procedure of data processing in a data processing apparatus illustrated in FIG. 6.
Figure 8:
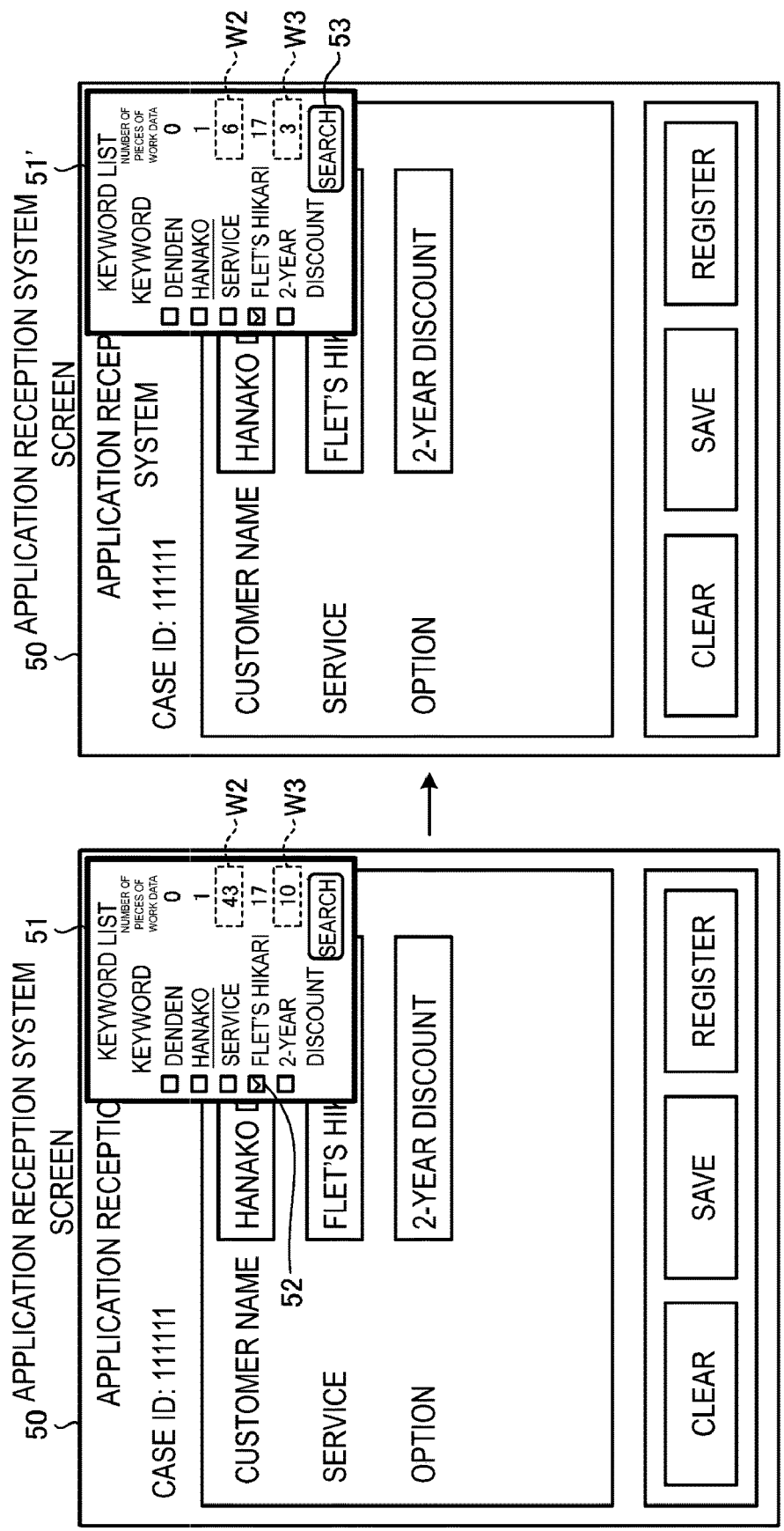
FIG. 8 is a diagram illustrating a procedure of data processing in a data processing apparatus illustrated in FIG. 6.

FIGS. 7 and 8 are diagrams illustrating a procedure of data processing in the data processing apparatus 210 illustrated in FIG. 6. As illustrated in a left drawing in FIG. 7, a case where the application reception system screen 50 is displayed on the terminal apparatus 2 will be described as an example.

In this case, the acquisition unit 151 extracts words included in the application reception system screen 50. In addition, the determination unit 2153 determines the number of pieces of work data in which each word is included, with reference to the inverted index. Subsequently, a keyword list 51 (a right drawing in FIG. 7) indicating "DENDEN", "HANAKO", "SERVICE", "FLET'S HIKARI", and "2-YEAR DISCOUNT", and the number of pieces of work data in which each search candidate word is included is displayed, for example, at the upper right of the application reception system screen 50 through the presentation processing of the presentation unit 2155. The data processing apparatus 210 may extract not only the words and the number of pieces of work data but also access information from the database 141 for the words in the keyword list 51, and may display a link (see a frame W1). The worker can display information on an access destination on the screen by clicking the link.

In addition, when the worker selects "FLET'S HIKARI" by inputting a check mark in a check box 52 (see a left drawing in FIG. 8) of the keyword list 51, the terminal apparatus 2 transmits selection information indicating that "FLET'S HIKARI" has been selected by the worker to the data processing apparatus 210, and the selection reception unit 2156 receives "FLET'S HIKARI" as a word to be searched for. Note that, in the example of FIG. 8, a case where one word is selected is illustrated as an example, but a plurality of words may be selected. In a case where there are a plurality of desired words, a worker is only required to input a check mark in each of check boxes of these words. In this case, the terminal apparatus 2 transmits selection information indicating the plurality of selected words to the data processing apparatus 210, and the selection reception unit 2156 receives the plurality of words as words to be searched for.

In addition, the determination unit 2153 determines the number of pieces of work data in which "FLET'S HIKARI" is also included among the work data in which "SERVICE" or "2-YEAR DISCOUNT" which is another search candidate is included, with reference to the inverted index, and presents the number of pieces of work data on the terminal apparatus 2.

As a result, a keyword list 51' in which the numbers of "SERVICE", "FLET'S HIKARI", and "2-YEAR DISCOUNT" being search candidate words (see frames W2 and W3) are updated is displayed in the terminal apparatus 2 as illustrated in a right drawing in FIG. 8.

In this manner, every time the worker selects a word from the keyword list 51, the data processing apparatus 210 can also display the keyword list 51' in which the number of pieces of work data including the selected word and each of the other words of the keyword list 51 is updated.

In addition, when a search button 53 of the keyword list 51' is selected by the worker, search instruction information for giving an instruction for searching using "FLET'S HIKARI" is transmitted from the terminal apparatus 2. In the data processing apparatus 210, the searching unit 154 searches for work data from the database 141 using "FLET'S HIKARI" which is a word to be searched for, in accordance with the search instruction information, and presents search results on the terminal apparatus 2.

Procedure of Data Processing Method

Figure 9:
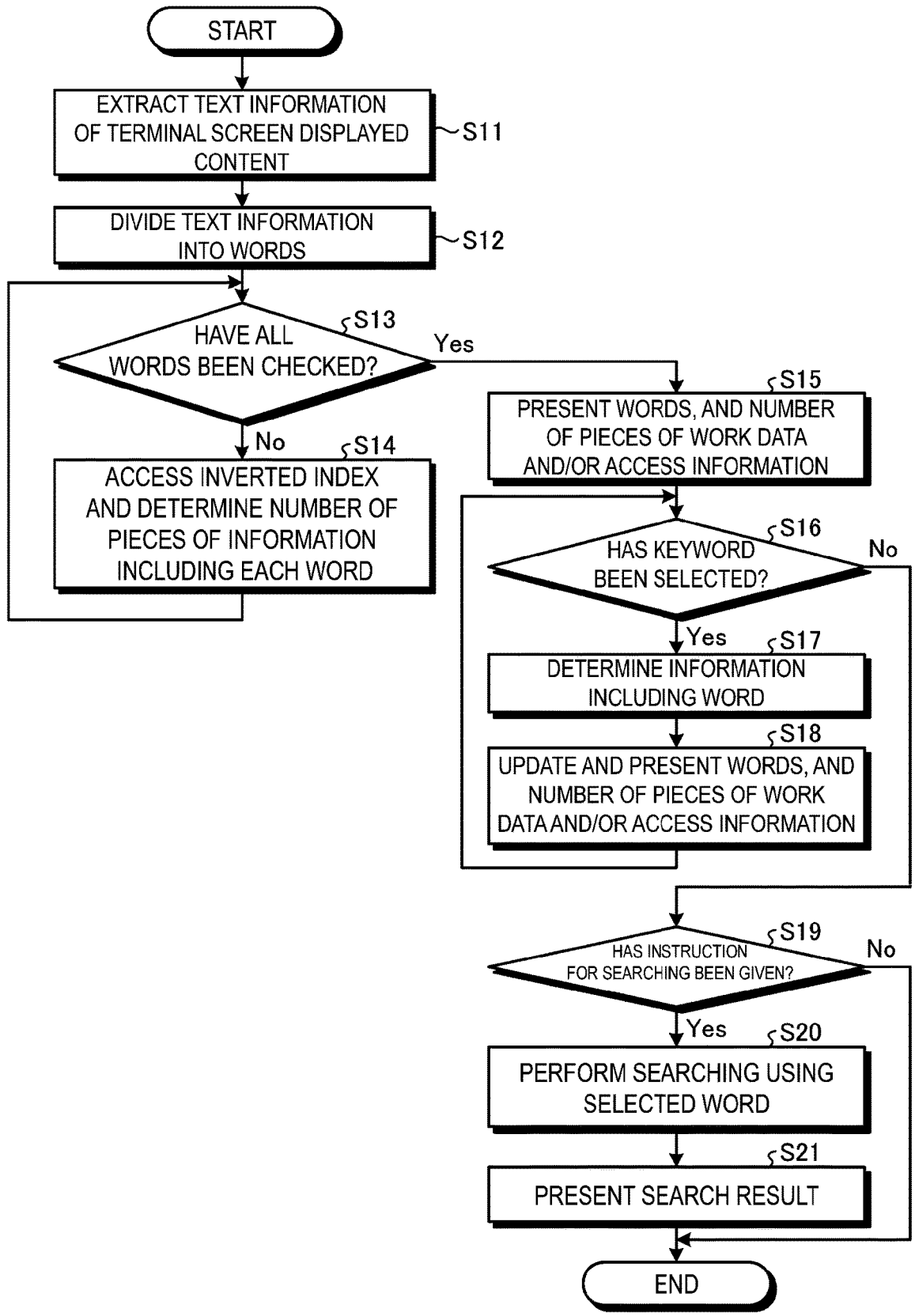
FIG. 9 is a flowchart illustrating a procedure of a data processing method according to the second embodiment.

Next, a procedure of a data processing method performed by the data processing apparatus 210 will be described with reference to FIG. 9. FIG. 9 is a flowchart illustrating a procedure of a data processing method according to the second embodiment.

Steps S11 and S12 illustrated in FIG. 9 are the same processing operations as those of steps S1 and S2 illustrated in FIG. 5. The determination unit 2153 determines whether all words obtained by the division in step S12 have been checked regarding the number of pieces of work data in which each word is included (step S13).

In a case where not all of the words obtained by the division have been checked regarding the number of pieces of work data in which each word is included (step S13: No), the determination unit 153 determines that a word to be determined is a search candidate in a case where the word to be determined is included in the inverted index of the inverted index database 142 and accesses the inverted index, and determines the number of pieces of work data in which the word to be determined is included (step S14). In addition, the determination unit 153 performs the determination processing in step S13.

In a case where all of the words obtained by the division have been checked regarding the number of pieces of work data in which each word is included (step S13: Yes), the presentation unit 2155 presents the search candidate words, and the number of pieces of work data in which each search candidate word is included and/or access information for the work data on the terminal apparatus 2 (step S15).

In addition, the selection reception unit 2156 determines whether a keyword (a word to be searched for) has been selected from the search candidate words presented on the terminal apparatus 2, based on whether selection information has been received from the terminal apparatus 2 (step S16).

In a case where the keyword has been selected (step S16: Yes), the determination unit 2153 determines work data in which the word to be searched for is included, among the pieces of work data in which the search candidate words are included, with reference to the inverted index (step S17). By the presentation unit 2155, the word to be searched for, and the number of pieces of work data in which each search candidate word and the word to be searched for are included and/or access information for the work data are updated and presented on the terminal apparatus 2 (step S18). Then, the processing returns to step S16. In a case where the keyword has not been selected (step S16: No), the selection reception unit 2156 proceeds to the processing of step S19.

The searching unit 154 determines whether an instruction for searching has been given (step S19). In a case where the instruction for searching has been given (step S19: Yes), the searching unit 154 searches the database 141 using the word to be searched for (step S20), and presents search results on the terminal apparatus 2 (step S21). In a case where the instruction for searching has not been given (step S19: No), the data processing apparatus 210 terminates the processing.

Effects of Second Embodiment

In this manner, the data processing apparatus 210 according to the second embodiment acquires words included in the terminal screen displayed content of the terminal apparatus 2 which is being operated by the worker, and determines that the acquired words are search candidates in a case where the acquired words are included in the inverted index. Further, the data processing apparatus 210 determines the number of pieces of work data in which each search candidate word is included with reference to the inverted index, and presents the search candidate words, and the number of pieces of work data in which each search candidate word is included and/or access information for the work data on the terminal apparatus 2.

Thereby, a list of the search candidate words included in the terminal screen displayed content of the terminal apparatus 2 and the number of pieces of work data in which each word is included is automatically displayed in the display screen of the terminal apparatus 2. Thus, the worker can ascertain the number of pieces of work data in which each word is included, among the words included in the terminal screen displayed content. In addition, because a link to each piece of work data is attached in the list, the worker can access and refer to the work data even when a user does not input a search keyword. Further, the worker can also select and search for a word desired to be used for searching, with reference to the number of pieces of work data. Thereby, it is possible to prevent the worker from performing searching using a word having no related work data, reduce the worker's processing burden and improve work efficiency of the worker, thereby achieving smooth work assistance.

Thus, according to the data processing apparatus 210, it is possible to appropriately acquire information on words included in the terminal screen displayed content and present the acquired information to the worker who operates the terminal apparatus 2.

Third Embodiment

Next, a third embodiment will be described. In the third embodiment, the number of pieces of work data including each word is displayed on the word included in a screen displayed content or in the vicinity of the word, and when the word is selected, access information (a URL, a file path, and the like) for the work data including the selected word is displayed. Thus, a worker can directly ascertain the number of pieces of work data in which each word is included and can access and refer to the work data even when a user does not input a search keyword.

Figure 10:
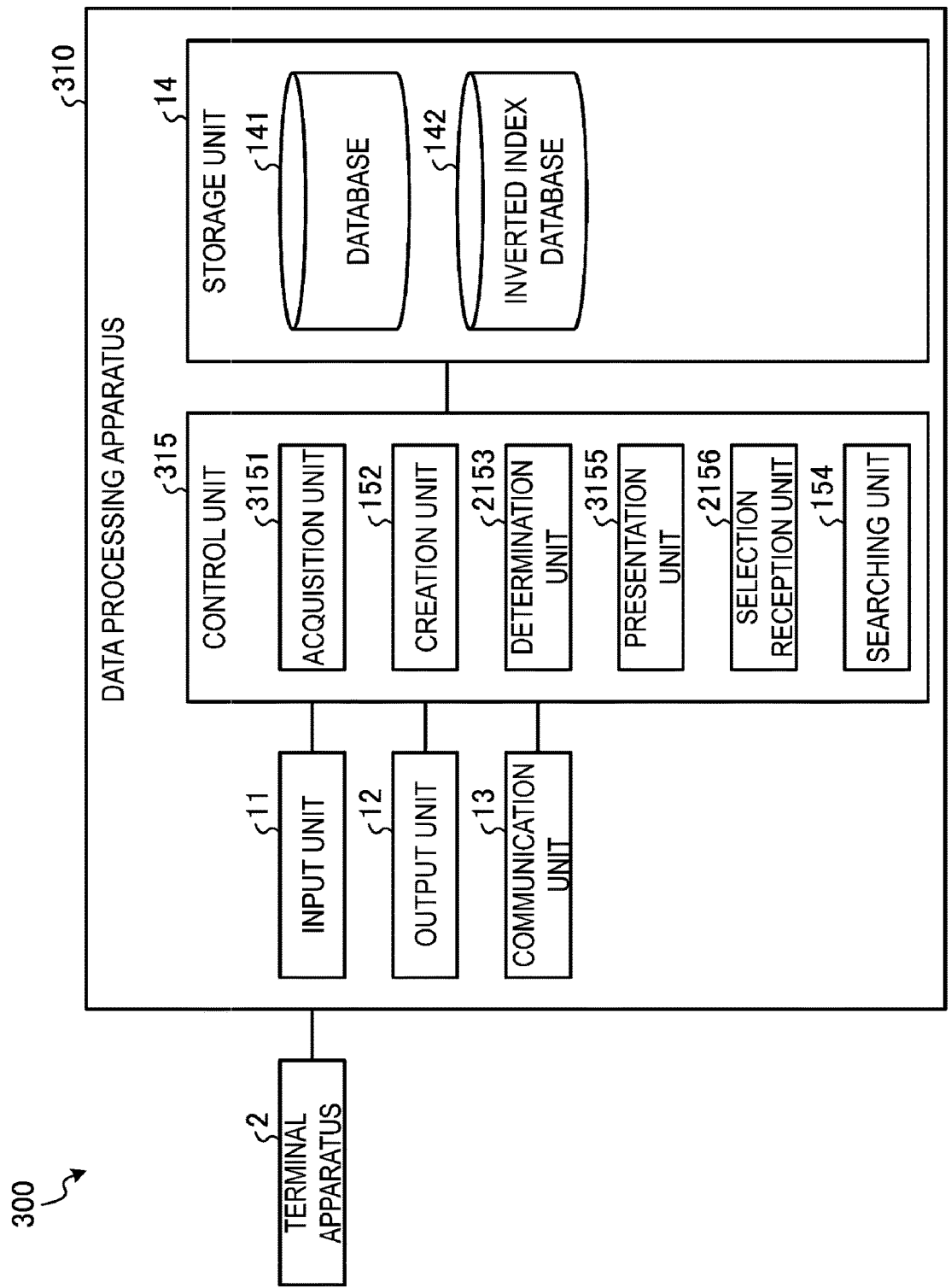
FIG. 10 is a diagram schematically illustrating an example of a configuration of a data processing system according to a third embodiment.

Next, a configuration of a data processing system according to the third embodiment will be described. FIG. 10 is a diagram schematically illustrating an example of the configuration of the data processing system according to the third embodiment. As illustrated in FIG. 10, the data processing system 300 includes a data processing apparatus 310 instead of the data processing apparatus 210 illustrated in FIG. 6.

Data Processing Apparatus

Next, the data processing apparatus 310 will be described. The data processing apparatus 310 includes a control unit 315 as compared to the data processing apparatus 210 in FIG. 6. The control unit 215 includes an acquisition unit 3151 instead of the acquisition unit 151, and includes a presentation unit 3155 instead of the presentation unit 2155, as compared to the control unit 15 in FIG. 6.

The acquisition unit 3151 acquires words included in a terminal screen displayed content being displayed on a terminal apparatus 2 and coordinates of each word in the screen. The acquisition unit 3151 acquires the terminal screen displayed contented being displayed on the terminal apparatus 2, and extracts text information of the terminal screen displayed content and coordinates of a position where each text data or each word included in the text data is displayed. Similar to the acquisition unit 151, the acquisition unit 3151 divides the extracted text information into words. Processing performed by the acquisition unit 3151 may be executed every time the terminal screen is changed, and may also be executed at a timing when a user gives a command, or the like.

The presentation unit 3155 displays the number of pieces of work data including each word included in the screen displayed content on the word or in the vicinity of the word on the display apparatus 2, based on each piece of text data acquired by the acquisition unit 315 or coordinates of the position of each word included in the text data within the screen. When the selection reception unit 2156 receives the selection of a word to be searched for by receiving selection information from the terminal apparatus 2, the searching unit 154 acquires an information ID of work data including the selected word from the inverted index, acquires access information on the work data from the database 154 by using the information ID, and displays the acquired access information on the terminal apparatus 2.

Example of Data Processing

Figure 11:
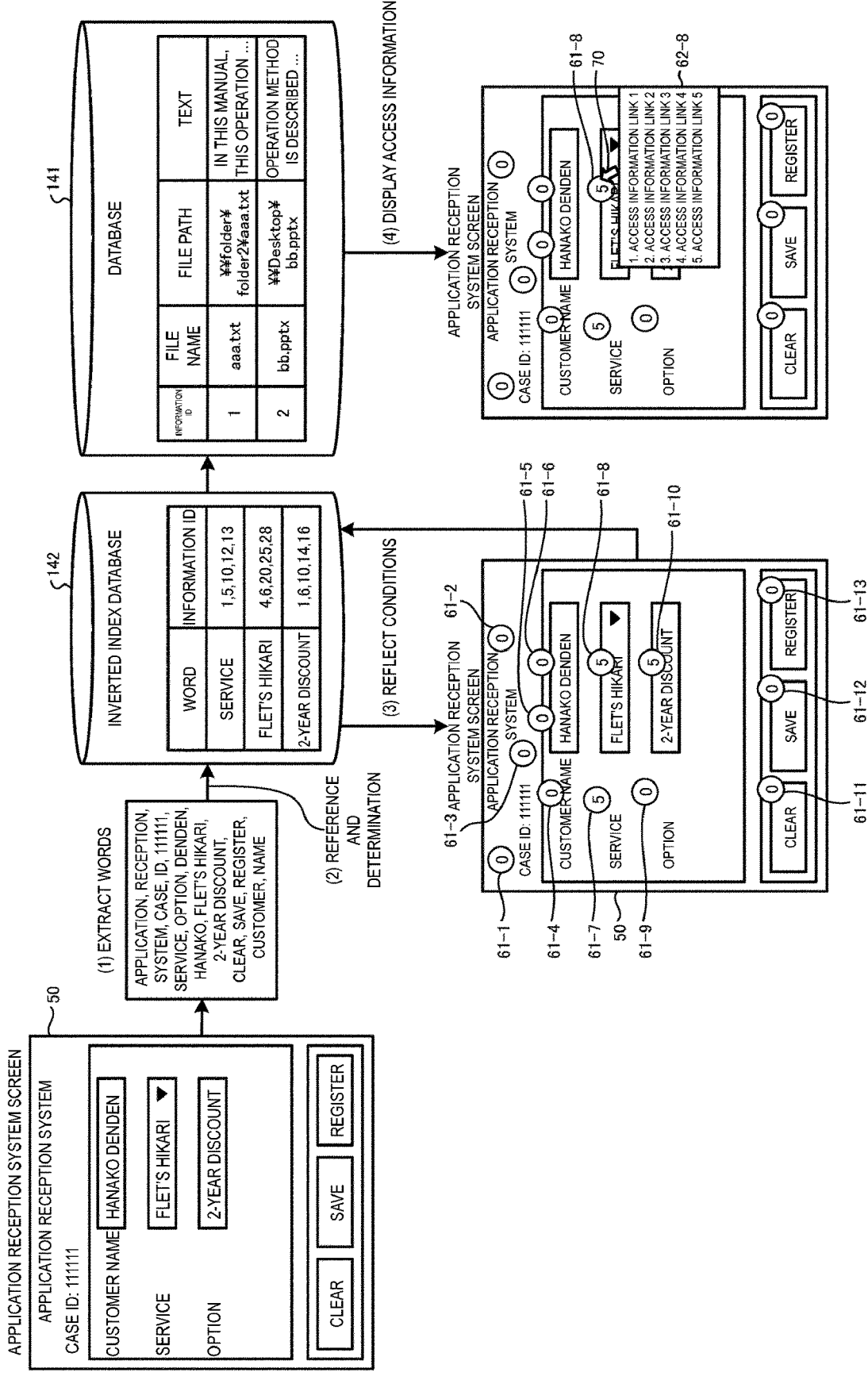
FIG. 11 is a diagram illustrating an example of execution of data processing in a data processing apparatus illustrated in FIG. 10.

FIG. 11 is a diagram illustrating an example of execution of data processing in the data processing apparatus 310 illustrated in FIG. 10. As illustrated in (1) in FIG. 11, a case where an application reception system screen 50 is displayed on the terminal apparatus 2 will be described as an example.

The acquisition unit 3151 extracts text data and coordinates of a position where the text data is displayed from the application reception system screen 50, and divides the text data into words by using a morphological analysis tool. Subsequently, a determination unit 2153 determines the number of pieces of work data in which each word is included, with reference to the inverted index. In addition, the presentation unit 3155 reflects the number of pieces of work data in which each word is included at an upper right of the word of the application reception system screen 50 (see (3) in FIG. 11). For example, as illustrated in (3) in FIG. 11, the data processing apparatus 20 displays presentation images 61-1 to 61-13 indicating the numbers of pieces of work data in which the words are included in circles, at the upper right of the words "APPLICATION RECEPTION SYSTEM", "CASE", "ID", "111111", "SERVICE", "OPTION", "DENDEN", "HANAKO", "SERVICE", "FLET'S HIKARI", "2-YEAR DISCOUNT", "CLEAR", "STORE", "REGISTER", "CUSTOMER", and "NAME" of the application reception system screen 50. The worker can ascertain the number of pieces of work data related to each word by the presentation images 61-1 to 61-13.

In addition, as illustrated in (4) in FIG. 11, the worker selects a word by moving a cursor 70 to one of the presentation images 61-1 to 61-13 or clicking one of the presentation images 61-1 to 61-13. In this case, the data processing apparatus 310 displays access information (a URL, a file path, and the like) for work data including the selected word on the same screen or a new screen, the access information being acquired from the database 141 by the searching unit 154 (see (4) in FIG. 11). For example, in a case where the worker moves the cursor 70 to the presentation image 61-8, an access information list 62-8 is displayed. The worker can display work data on the screen by clicking a link of desired data of the access information list 62-8.

Procedure of Data Processing Method

Figure 12:
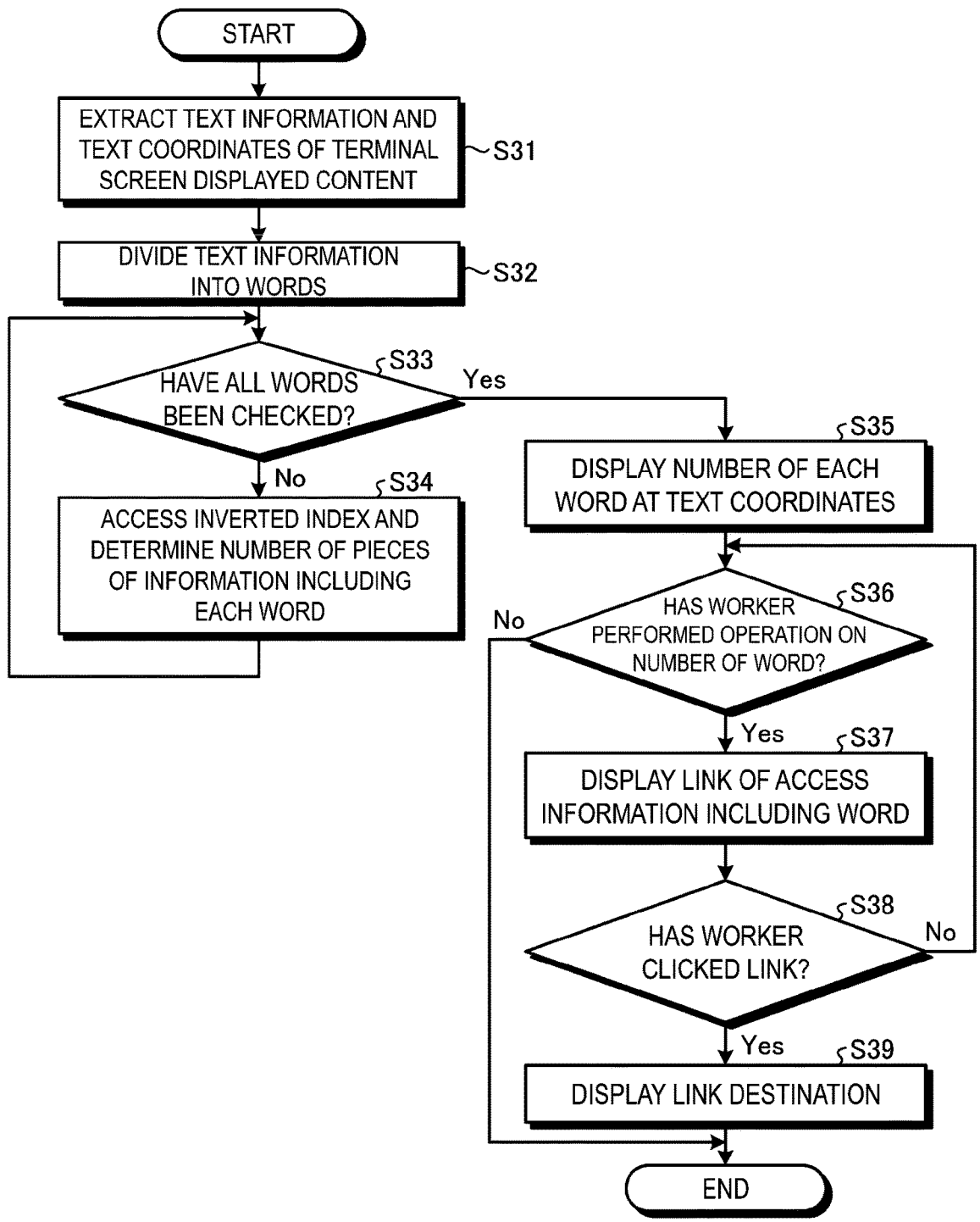
FIG. 12 is a flowchart illustrating a procedure of a data processing method according to the third embodiment.

Next, a procedure of a data processing method performed by the data processing apparatus 310 will be described with reference to FIG. 12. FIG. 12 is a flowchart illustrating the procedure of the data processing method according to the third embodiment.

As illustrated in FIG. 12, the acquisition unit 3151 extracts text data and coordinates of each piece of text data from a terminal screen displayed content (step S31). Steps S32 to S34 are the same processing operations as those of steps S12 to S14 illustrated in FIG. 9.

In a case where all of the words obtained by the division have been checked regarding the number of pieces of work data in which each word is included (step S33; Yes), the presentation unit 3155 displays the number of this word at coordinates of text including each search candidate word of the terminal screen on the terminal apparatus 2 (step S35).

In addition, the data processing apparatus 310 determines whether the worker has performed an operation on each displayed number (step S36). In a case where the worker has not performed an operation on the displayed number (step S36: No), the data processing apparatus 310 terminates the processing. On the other hand, in a case where the worker has performed an operation on the displayed number (step S36: Yes), the searching unit 154 searches for access information including the word corresponding to the operated number, and the presentation unit 3155 displays a link of the searched access information on the terminal apparatus 2 (step S37).

In addition, the data processing apparatus 310 determines whether the worker has clicked the link (step S38). When the worker has not clicked the link (step S38: No), the data processing apparatus 310 returns to the determination processing in step S36. In a case where the worker has clicked the link (step S38: Yes), the data processing apparatus 310 displays the clicked link destination on the terminal apparatus 2 (step S39).

Effects of Third Embodiment

In this manner, the data processing apparatus 310 according to the third embodiment displays the number of pieces of work data in which each word included in the screen displayed content is included, in the vicinity of the word. When a word is selected by a worker, the data processing apparatus 310 displays access information for work data including the selected word, and thus the worker can directly ascertain the number of pieces of work data in which each word is included and can access and refer to the work data even when a user does not input a search keyword.

Thus, according to the data processing apparatus 310, it is possible to prevent the worker from performing searching using a word having no related work data, reduce the worker's processing burden and improve work efficiency of the worker, thereby achieving smooth work assistance. Thus, according to the data processing apparatus 310, it is possible to appropriately acquire information on words included in the terminal screen displayed content and to present the acquired information to the worker who operates the terminal apparatus 2.

System Configuration and the Like

The components of the apparatuses illustrated are functionally conceptual and are not necessarily physically configured as illustrated. That is, a specific form of distribution and integration of the respective apparatuses is not limited to the one illustrated in the figure, and all or some of the apparatuses can be configured to be functionally or physically distributed and integrated in given units according to various loads, use situations, or the like. Further, all or any part of the processing functions performed in the apparatuses may be implemented by a CPU and a program to be interpreted/performed by the CPU or may be implemented as hardware by a wired logic.

Among the processing operations described in the embodiments, all or some of processing operations described as being performed automatically may be performed manually or all or some of processing operations described as being performed manually may be performed automatically according to a known method. In addition, information including the procedures, control procedures, specific names, and various types of data or parameters in the above description and drawings can be freely changed unless otherwise described.

Program

Figure 13:
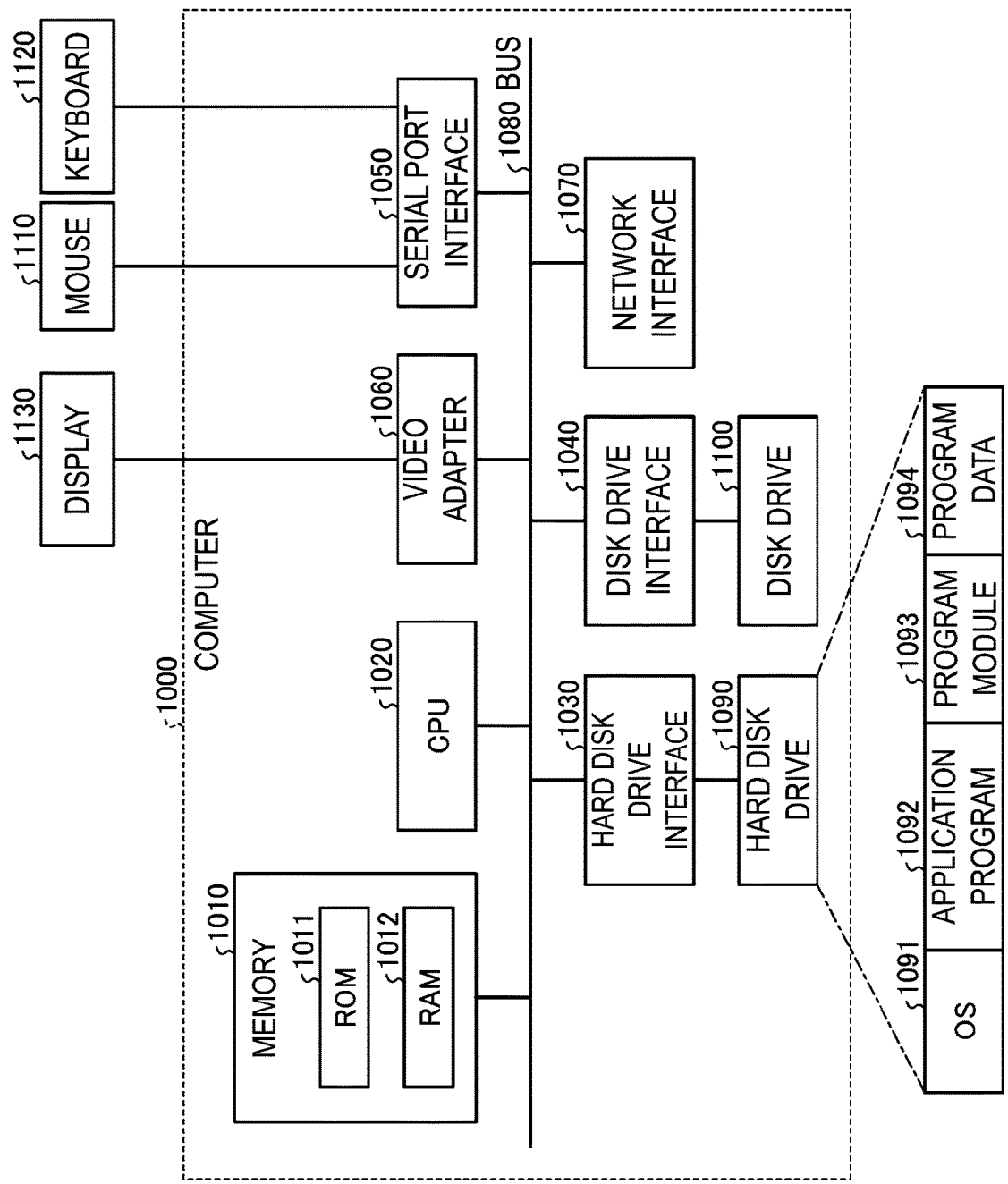
FIG. 13 is a diagram illustrating an example of a computer implementing the data processing apparatus by executing a program.

FIG. 13 is a diagram illustrating an example of a computer for implementing the data processing apparatuses 10, 210, and 310 by executing a program. The computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program defining each processing operation of the data processing apparatuses 10, 210, and 310 is implemented as the program module 1093 in which a computer-executable code is described. The program module 1093 is stored in, for example, the hard disk drive 1090. For example, the program module 1093 for executing the same processing operations as those of functional configurations in the data processing apparatuses 10, 210, and 310 is stored in the hard disk drive 1090. The hard disk drive 1090 may be replaced with a solid state drive (SSD).

Further, configuration data to be used in the processing of the embodiment described above is stored as the program data 1094 in, for example, the memory 1010 or the hard disk drive 1090. The CPU 1020 reads the program module 1093 and the program data 1094 stored in the memory 1010 or the hard disk drive 1090 into the RAM 1012 and executes the program module 1093 and the program data 1094, as necessary.

The program module 1093 and the program data 1094 are not limited to being stored in the hard disk drive 1090 and may be stored, for example, in a removable storage medium and read by the CPU 1020 via the disk drive 1100 or the like. Alternatively, the program module 1093 and the program data 1094 may be stored in another computer connected via a network (a local area network (LAN), a wide area network (WAN), or the like). The program module 1093 and the program data 1094 may be read by the CPU 1020 from another computer via the network interface 1070.

Although embodiments to which the invention made by the inventor is applied have been described, the present disclosure is not limited by the description and the drawings that form a part of the present disclosure according to the present embodiments. In other words, various alternative embodiments, examples and operational techniques that persons skilled in the art perform based on the present embodiment will fall within the scope of the present disclosure.

REFERENCE SIGNS LIST

2 Terminal apparatus
10, 210, and 310 Data processing apparatus
11 Input unit
12 Output unit
13 Communication unit
14 Storage unit
15, 215, 315 Control unit
100, 200, 300 Data processing system
141 Database 142 Inverted index database
151, 3151 Acquisition unit
152 Creation unit
153, 2153 Determination unit
154 Searching unit
2155, 3155 Presentation unit
2156 Selection reception unit

The invention claimed is:

1. A data processing apparatus comprising:
a processor; and
a memory device storing instructions that, when executed by the processor, configure the processor to:
acquire words from a user interface on a terminal screen;
determine one or more words among the acquired words to be one or more search candidates based on the one or more words matching one or more entries included in an inverted index, wherein each entry of the inverted index comprises a word and at least one information identifier identifying at least one document including the word;
perform a search using the one or more search candidates; and
present one or more documents associated with each of the one or more search candidates on the user interface on the terminal screen.

2. The data processing apparatus according to claim 1, wherein the processor is further configured to:
search for work data from a database configured to store access information for the work data and text information included in the work data by using the words being the search candidates, and to present search results on a terminal.

3. The data processing apparatus according to claim 1, wherein
wherein the processor is configured to determine the number of pieces of work data including each word being the search candidate with reference to the inverted index, and presents, on the terminal, each word being the search candidate, and the number of pieces of work data including each word being the search candidate and/or the access information for the work data.

4. The data processing apparatus according to claim 3, wherein the processor is further configured to:
receive selection of a word to be searched for from among the words being the search candidates; and
search for work data from a database configured to store access information for the work data and text information included in the work data by using the word to be searched for according to a searching instruction.

5. The data processing apparatus according to claim 4, wherein
wherein the processor is configured to determine work data including the word to be searched for among the work data including the words being the search candidates with reference to the inverted index, and presents, on the terminal, the words being the search candidates, and the number of pieces of work data including the word to be searched for and each word being the search candidate.

6. The data processing apparatus according to claim 1, wherein the processor is further configured to present a link to each document on the user interface.

7. The data processing apparatus according to claim 1, wherein the processor is further configured to:
receive a selection of a search candidate among the one or more search candidates; and
update the number of documents associated with an unselected search candidate among the one or more search candidates, wherein each document associated with the unselected search candidate comprises both the unselected search candidate and the selected search candidate.

8. A data processing method executed by a data processing apparatus, the data processing method comprising:
acquiring words from a user interface on a terminal screen;
determining one or more words among the acquired words to be one or more search candidates based on the one or more words matching one or more entries included in an inverted index, wherein each entry of the inverted index comprises a word and at least one information identifier identifying at least one document including the word;
performing a search using the one or more search candidates; and
presenting one or more documents associated with each of the one or more search candidates on the user interface on the terminal screen.

9. A non-transitory computer readable medium storing a program, wherein executing of the program causes a computer to perform operations comprising:
acquiring words from a user interface on a terminal screen;
determining one or more words among the acquired words to be one or more search candidates based on the one or more words matching one or more entries included in an inverted index, wherein each entry of the inverted index comprises a word and at least one information identifier identifying at least one document including the word;
performing a search using the one or more search candidates; and
presenting one or more documents associated with each of the one or more search candidates on the user interface on the terminal screen.

* * * * *